No. 693,140. Patented Feb. 11, 1902.
W. E. KNIGHT.
MOUTH MIRROR.
(Application filed June 15, 1901.)
(No Model.)
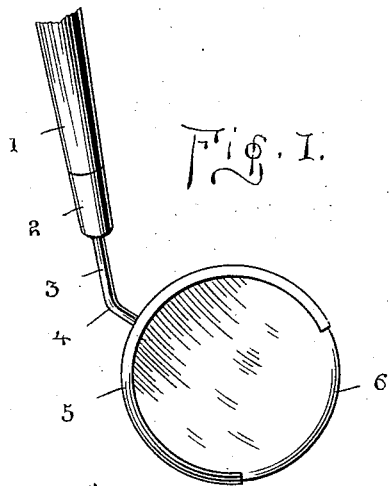
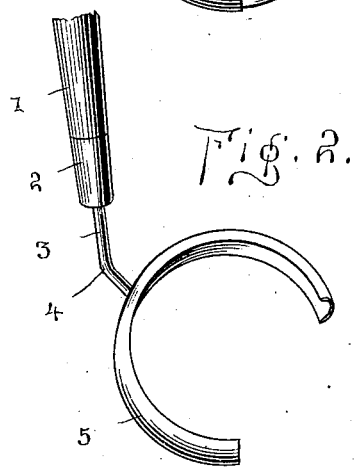
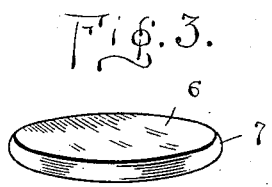
Witnesses
T. W. Riley
Geo. Ackman
Inventor
Wm. E. Knight,
By Victor J. Evans.
Attorney

UNITED STATES PATENT OFFICE.

WILLIAM E. KNIGHT, OF OSTRANDER, OHIO.

MOUTH-MIRROR.

SPECIFICATION forming part of Letters Patent No. 693,140, dated February 11, 1902.

Application filed June 15, 1901. Serial No. 64,712. (No model.)

*To all whom it may concern:*

Be it known that I, WILLIAM E. KNIGHT, a citizen of the United States, residing at Ostrander, in the county of Delaware and State of Ohio, have invented new and useful Improvements in Mouth-Mirrors, of which the following is a specification.

My invention relates to mouth-mirrors for the use of dentists and surgeons; and its object is to provide novel and effective means for detachably connecting a mirror with a handle, whereby the mirror may be readily reversed.

The invention comprises a handle, a resilient clamp secured thereto, and a circular mirror detachably fitting the clamp.

The construction of the improvement will be fully described hereinafter in connection with the accompanying drawings, which form part of this specification, and its novel features will be defined in the appended claim.

In the drawings, Figure 1 is a view in perspective of a mouth-mirror embodying the invention. Fig. 2 is a similar view of the handle and supporting-clamp secured thereto, and Fig. 3 is a view in perspective of the mirror detached.

The reference-numeral 1 designates the handle of the device, upon which is a fitted ferrule 2. Projecting from the ferrule is a shank 3, bent laterally at the point 4 and secured at its lower end to a resilient clamp 5, preferably comprising a strip of spring metal of concavo-convex form in cross-section. The strip is bent to receive a circular mirror 6, and said clamp is of such length as to embrace the mirror for a distance exceeding half the circumference thereof, thus insuring the secure attachment of the mirror within the clamp. The peripheral edge of the mirror is convex, or a convex metallic rim 7 may be employed, surrounding the mirror and fitting the concave clamp.

The mirror 6 has reflecting-surfaces on both sides, and one or both sides may be magnifying.

It will be apparent that the mirror may be readily pulled from between the resilient sides and ends of the clamp, reversed, and reinserted, and that the device constitutes a very serviceable but inexpensive implement for dentists and surgeons.

I claim—

A mouth-mirror comprising a handle, a resilient clamp secured thereto and a circular mirror fitting within the clamp, the latter extending only part way around the mirror to permit the mirror to be inserted and withdrawn.

In testimony whereof I affix my signature in presence of two witnesses.

WILLIAM E. KNIGHT.

Witnesses:
   KIRWAN K. KALB,
   S. G. DYKES.